US005608785A

United States Patent [19]
Kasday

[11] Patent Number: 5,608,785
[45] Date of Patent: Mar. 4, 1997

[54] METHOD AND APPARATUS FOR TELEPHONE PRIZE OPPORTUNITIES

[75] Inventor: Leonard R. Kasday, Moorestown, N.J.

[73] Assignee: Lucent Technologies Inc., Murray Hill, N.J.

[21] Appl. No.: 125,973

[22] Filed: Sep. 23, 1993

[51] Int. Cl.[6] .................... H04M 11/00
[52] U.S. Cl. .................... 379/90; 364/412; 902/213; 379/201
[58] Field of Search .................... 379/90, 91, 93–99, 379/110, 144, 201; 364/401, 406, 408, 410, 412; 902/23; 235/383, 375; 273/236, 237, 269, 138 A, 148 R

[56] References Cited

U.S. PATENT DOCUMENTS

| | | | |
|---|---|---|---|
| 4,439,636 | 3/1984 | Newkirk et al. | 379/144 |
| 4,595,983 | 6/1986 | Gehalo et al. | 379/144 |
| 4,669,730 | 6/1987 | Small . | |
| 4,815,741 | 3/1989 | Small . | |
| 4,996,705 | 2/1991 | Entenmann et al. | 379/91 |
| 5,025,372 | 6/1991 | Burton et al. | 364/406 |
| 5,048,075 | 9/1991 | Katz | 379/92 |
| 5,083,272 | 1/1992 | Walker et al. | 379/97 |
| 5,128,983 | 7/1992 | Tanaka | 379/91 |
| 5,136,633 | 8/1992 | Tejada et al. | 379/91 |

FOREIGN PATENT DOCUMENTS

| | | | |
|---|---|---|---|
| 1162336 | 2/1984 | Canada | 379/90 |

*Primary Examiner*—Wing F. Chan

[57] ABSTRACT

A telephone network is modified so that callers making telephone calls can engage in a game of chance to win a prize without having had to specially dial the game processor, i.e., the telephone numbers of the telephone calls are independent of the game processor. In one embodiment of the invention, the game processor is part of the switch that processes calls through a telecommunications network. Upon conclusion of the game, the caller is supplied with an indication as to whether or not he is a winner and will receive a prize. The determination that a caller is a winner need be made only if the call was successfully completed, that is, routed to a destination at which the call is answered. Advantageously, a) games of chance are attractive to people, especially when it costs nothing to enter, b) the determination that a caller is a winner can be immediately conveyed to him, and c) by proper selection of the odds of winning and the value of prizes, the game can be arranged so that its cost to a telecommunications carder is less than that carrier's present discounting program.

26 Claims, 5 Drawing Sheets

*FIG. 2*

| CARD NUMBER LENGTH (200) | ISSUER ID (202) | QUERY PROTOCOL (204) | ISSUER NAME (208) |
|---|---|---|---|
| 13 | 4128 | IXC CCS | CITIBANK VISA |
| 14 | 9082-9089 | LEC CCS | NEW JERSEY BELL |
| 14 | 2012-2019 | LEC CCS | NEW JERSEY BELL |
| 14 | 2122-2129 | LEC CCS | NYNEX |
| 14 | 5080-5081 | IXC CCS | AT&T TELEPHONE |
| 15 | 340000-349999 | IXC CCS | AMERICAN EXPRESS |
| 15 | 370000-379999 | IXC CCS | AMERICAN EXPRESS |
| 16 | 4784 | IXC CCS | AT&T UNIVERSAL VISA |

METHOD AND APPARATUS FOR TELEPHONE PRIZE OPPORTUNITIES

TECHNICAL FIELD

This invention relates to the providing of incentives to entice callers to make more telephone calls or calls of longer durations.

BACKGROUND OF THE INVENTION

To attract and retain callers and call volume in the face of competition, telecommunications carriers have placed a heavy emphasis on the amounts and types of discounts they offer. This is especially true of the interexchange carriers. Such discounting, however, comes at a high cost to the telecommunications carriers, and does not always produce the desired benefits of attracting and retaining callers and call volume on the carriers' telecommunications networks. One reason for this is that the benefits of such discounting can only be seen by the caller when the bill from the telecommunications carrier arrives, which is generally long after the calls are made. Thus, there is a need for a telecommunications carrier to improve its ability to attract and retain callers and call volume using methods that a) are desirable to callers, b) have benefits that are perceived immediately, or nearly so, by the caller, and c) cost the telecommunications carrier less than current discounting programs.

SUMMARY OF THE INVENTION

A telephone network is modified, in accordance with the principles of the invention, so that callers making business and personal telephone calls can also be automatically, or at their own discretion, engaged in a game of chance to win a prize without dialing an additional telephone number to call the game processor running the game of chance. That is, the telephone numbers for the business and personal telephone calls are independent of any addressing mechanism, such as a telephone number, for the game processor. Advantageously, a) games of chance are attractive to people, especially when it costs nothing to enter, b) the determination that a caller is a winner can be immediately conveyed to him, and c) by proper selection of the odds of winning and the value of prizes, the game can be arranged so that its cost to a telecommunications carrier is less than that carrier's present discounting program.

In one embodiment of the invention, the game processor can be part of the switch that processes calls through a telecommunications network. Upon conclusion of the game, the caller is supplied with an indication as to whether or not he is a winner and will receive a prize. The determination that a caller is a winner need be made only if the call was successfully completed, that is, routed to a destination at which the call is answered.

BRIEF DESCRIPTION OF THE DRAWING

In the drawing:

FIG. 2 shows an exemplary structure for the information stored in the card recognition data base of FIG. 1;

DETAILED DESCRIPTION

Figure 1:
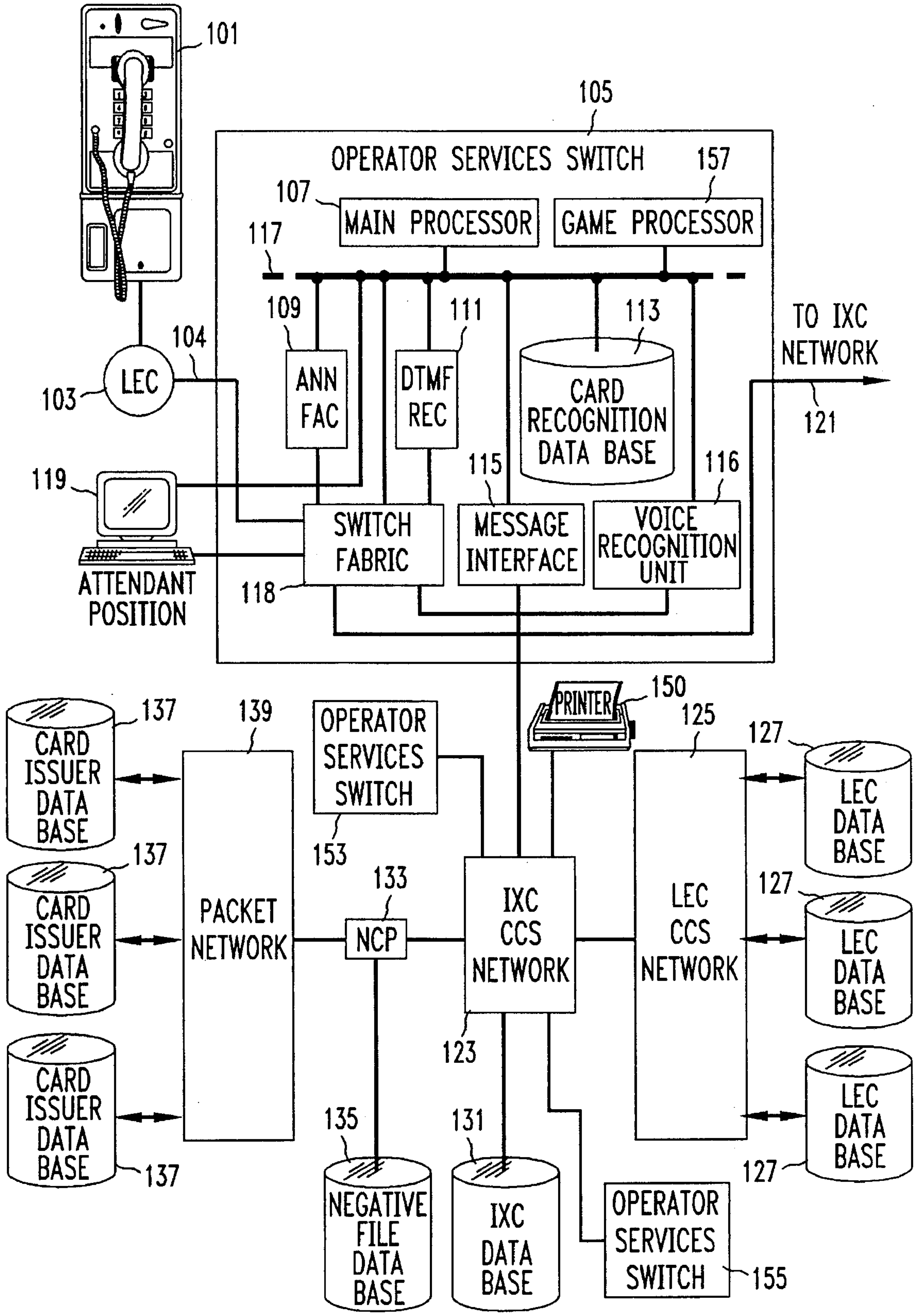
FIG. 1 shows exemplary apparatus for use in processing card calls in accordance with the principles of the invention.

FIG. 1 shows exemplary apparatus for use in processing card calls for which the caller, after completing his call, is entered into a game of chance to win a prize, in accordance with the principles of the invention.

As used herein, the term "card" refers to any type of credit card or credit account mechanism including, but not limited to: a) a telephone-company-issued card, such as the Bell Atlantic™ IQ Card, b) a combined commercial credit card and telephone card, such as the AT&T Universal Card, c) a commercial credit card, such as an American Express® card or a VISA® card, or d) a debit card. A "card call" is a telephone call whose cost is charged to the account associated with a card. Other common ways of referring to a "card call" are: a) a call charged to a card, or b) a call charged to a card number. A "card number" is a multi-character string that identifies the account associated with a card. Since it is generally the card number that is required for entering into a transaction using the account associated with a card, card issuers, i.e., the providers of the credit for each card, must provide a card holder with the card number but need not provide the card holder with a physical object that represents the card, e.g., an embossed plastic card. To successfully complete a card call, the caller may be required to supply a personal identification number (PIN) that is separate from the card number.

A calling party originates a card call at telephone station 101 by a) dialing 0+area code+number or b) access code+0+area code+number. A switch of local exchange carder (LEC) 103 receives the dialed digits and, from the dialed 0, recognizes that the call is an operator services type of call that may be a card call. Therefore, local exchange carder (LEC) 103 routes the call to operator services switch 105 for further handling. Operator services switch 105 is a switch that, given the description hereinbelow, can be designed by applying those principles well known to those skilled in the art, to provide special operator type calling services to calling parties, including functionality for realizing the principles of the invention.

If an access code for a specific interexchange carrier (IXC) is not specified as part of the digits dialed by the calling party but yet the call must be carried by an interexchange carder, local exchange carder 103 routes the call over a trunk, e.g., trunk 104, to an operator services switch of an interexchange carder, e.g., operator services switch 105. Local exchange carder 103 is aware of a default interexchange carder to which telephone station 101 has been assigned. If the dialed digits include an access code specifying a particular interexchange carder, local exchange carder 103 routes the call over a trunk to an operator services switch 105 of the specified interexchange carder. If the call is one which is not to be carded by an interexchange carrier, local exchange carder 103 routes the call to one of its own operator services switches.

Operator services switch 105 includes: a) main processor 107, b) announcement facility (ANN FAC) 109, c) dual tone multi-frequency receiver (DTMF REC) 111, d) card recognition data base 113, e) message interface 115, f) bus 117, g) switch fabric 118, h) voice recognition unit 116, and i) game processor 157. Main processor 107 controls the overall operation of operator services switch 105 by performing any necessary processing and exchanging messages with the other components of operator services switch 105 over bus 117. Announcement facility (ANN FAC) 109 can make various announcements which can be heard by the calling party. The announcements, or combinative portions thereof, are prestored in announcement facility (ANN FAG) 109. They are accessed by supplying announcement facility (ANN FAC) 109 with pointers to the announcements. In accordance with the invention, such combinative portions include the speech elements necessary for the game of chance. The announcement portions may also include, in accordance with an aspect of the invention, the various prizes that may be won.

Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107. Card recognition data base 113 contains at least the information necessary to determine from the digits supplied by a calling party the issuer of the card to which the call is to be charged. Message interface 115 is a protocol conversion unit that permits operator services switch 105 to communicate with a common channel signaling (CCS) network, such as IXC CCS network 123. It is responsible for formatting all messages transmitted to IXC CCS network 123 and for extracting responses received from IXC CCS network 123. In particular, as described in more detail below, card validation query messages are transmitted to IXC CCS network 123 while card valid or invalid response messages are received therefrom.

At various times during a call, switch fabric 118 connects the trunk on which the calling party's call arrived at operator services switch 105, e.g., trunk 104, to announcement facility (ANN FAC) 109 or dual tone multi-frequency receiver (DTMF REC) 111. The purposes of such connections are described further below. Once the authentication and billing for a call has been attended to, and the call can be routed to its ultimate destination, switch fabric 118 connects the trunk on which the calling party's call arrived to the rest of the interexchange carrier's network, via link 121.

Game processor 157 is a self-contained game playing machine. It has access to all the facilities of operator services switch 105 that are available to main processor 107. Thus, game processor 157 can a) communicate with the caller, b) obtain any piece of information about a call or caller that main processor 107 could obtain, and c) may store its own unique information about gaming odds and past game playing histories of callers. In some embodiments of the invention, game processor 157 may be merged with main processor 107 and implemented as special software running thereon. In other embodiments of the invention, game processor 157 may be entirely separate from main processor 107 and it may even be separate from operator services switch 105. Given the description herein, those skilled in the art will know how to design and program game processor 157.

Attendant position 119, staffed by a human attendant, also interfaces with operator services switch 105 via both bus 117 and switch fabric 118. The interface via bus 117 permits the attendant to exchange information with main processor 107. The interface via switch fabric 118 allows the attendant to converse with the calling party.

It is noted that for load sharing and reliability purposes a telecommunications carrier may have more than one operator services switch, e.g., the network of the carrier shown in FIG. 1 includes at least operator services switches 105, 153 and 155. Although not shown in detail, each of the operator services switches has a structure similar to that of operator services switch 105.

IXC CCS network 123 can route queries for card number validation and for authentication a) to LEG CCS network 125 and ultimately to one of LEG data bases 127, b) to IXC data base 131 or c) to network control point (NCP) 133 and ultimately to either negative file data base 135 (not for authentication query messages) or one of card issuer data bases 137, via packet network 139. NCP 133 is a unit of known type that interfaces with packet network 139 and negative file data base 135 so as to present the information contained therein to IXC CCS network 123 as if it originated from a single data base.

Negative file data base 135 contains a list of so-called "hot cards". Hot cards are cards that are known to be invalid, e.g., cards that were reported stolen. Using such a data base speeds the processing of each call attempted using a hot card in that it avoids a full search of the data base of the card issuer. The list of hot cards is supplied periodically by the commercial card issuers. All the other data bases contain at least listings of valid card numbers against which the card number supplied by the calling party is compared. Furthermore, if the other data bases are implemented in accordance with the invention, they may also contain, for each valid card number stored therein, information concerning the length and/or frequency of calls charged to each card. If the card number is not found in the hot card list of negative file data base 135 (FIG. 1), a card validation query is sent via packet network 139 to the card issuer data base 137 maintained by the particular card issuer.

Calling cards issued by telephone companies have telephone-line-number-based numbers, which comprise 1) a subscriber's telephone number plus 2) a 4 digit PIN. These cards can be distinguished from commercial credit cards on the basis of the length of their card numbers. Other cards having numbers of the same length as telephone-company-issued-line-number-based cards are distinguished therefrom by properties which make the numbers of the other cards invalid as telephone numbers, such as having a zero as the fourth digit. Should some of the card numbers of two or more card issuers overlap, with no distinguishable features between them, it may be necessary to prompt the calling party for an indication of the issuer of the card that the calling party is using. Such prompting, as well as the receiving of the indication, would be performed by announcement facility (ANN FAG) 109 and dual tone multi-frequency receiver (DTMF REC) 111 working under the control of main processor 107.

FIG. 2 shows an exemplary structure for the information stored in card recognition data base 113. An entry for each issuer is made up of several fields, including a) card number length field 200, b) issuer identification (ID) field 202, c) query protocol field 204, d) issuer name field 208. Card number length field 200 contains the length, i.e., the number of digits, of the card numbers issued by a particular card issuer. The issuer identification (ID) field 202 contains a code or range of codes, up to 5 digit in length, that uniquely identifies the card issuer. Although any number of digits may be used, 5 digits was selected because a) it includes 3 digits, which is the maximum number of digits required under the ISO standard for identifying card issuers and b) it can also accommodate particular telephone-company-issued calling cards such as those that begin with "89". The card number typically includes both a prefix identifying the card issuer and an account number indicating the individual account, so that the issuer identification (ID) field is the first group of numbers embossed on the card as its number. Advantageously, then, in the preferred embodiment, main processor 107 need only examine a) a card's prefix and b) its length to determine the card issuer.

Each card issuer may specify its own format to which queries for validation of card numbers or authentications must conform in order to be processed. Query protocol field 204 contains indications that specify the proper format for each card issuer. These indications are used by main processor 107 (FIG. 1) to build query messages requesting validation of card numbers or authentication of a caller in response to authentication information supplied by the caller. The query messages are transmitted via message interface 115 to IXC CCS network 123 and ultimately to the proper data base. Issuer name field 208 contains the name of the card issuer.

Figure 3:
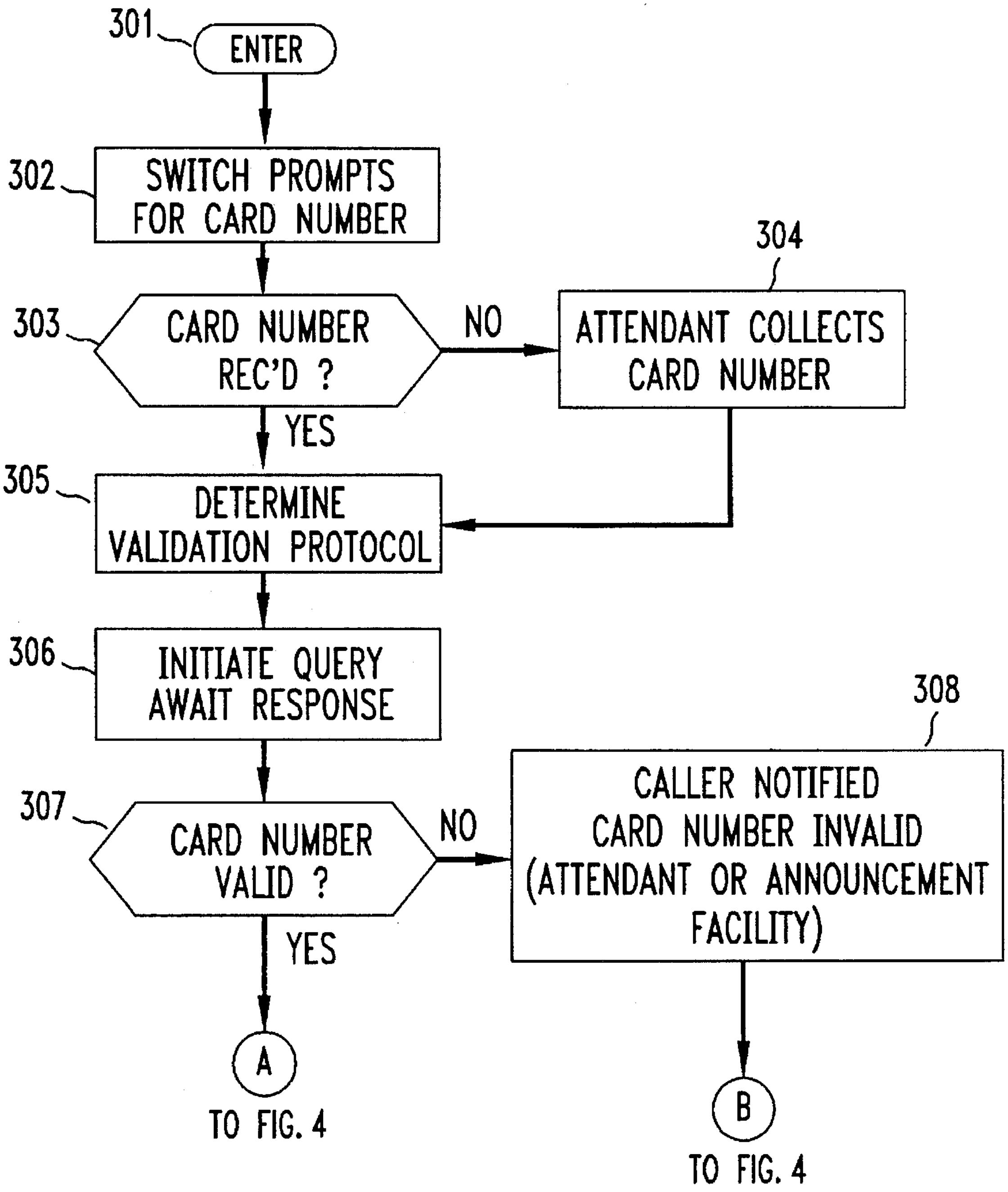
FIGS. 3 and 4 together show a flow chart of a process for validating a card number for a call and for providing the caller with the possibility of receiving a prize for having made the call, in accordance with the principles of the invention.
Figure 4:
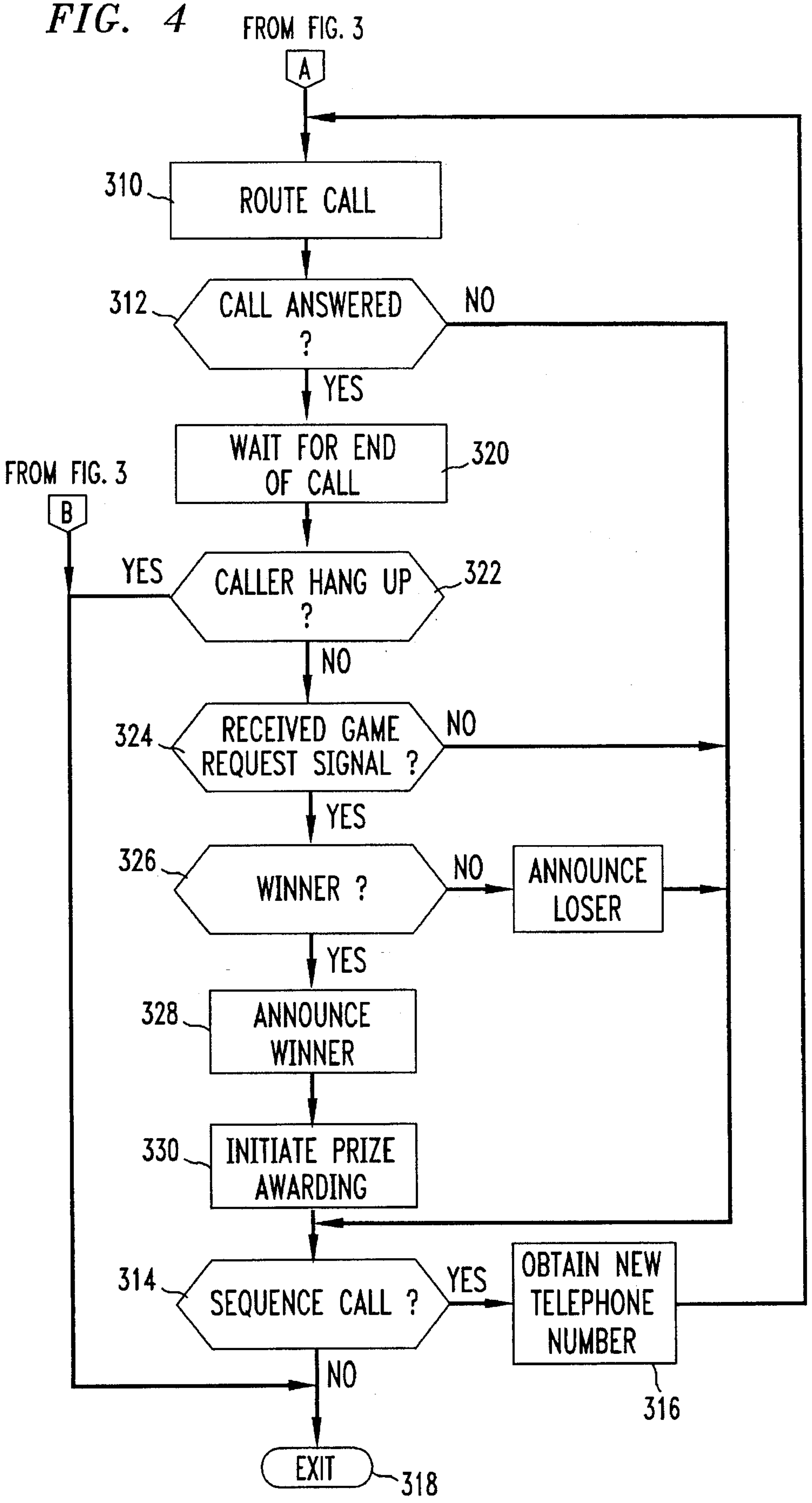

FIGS. 3 and 4 together show a flow chart of a process for validating a card number for a call and for providing the caller with the possibility of receiving a prize or bonus for having made the call, in accordance with the principles of the invention. The process is entered, in step 301, when a caller at telephone station 101 (FIG. 1 ) initiates a 0+type of telephone call. The call information, including the dialed digits, is routed by LEG 103 to operator services switch 105. In step 302 (FIG. 3) operator services switch 105 prompts the calling party to supply his card number. To do so, switch fabric 118 connects announcement facility (ANN FAG) 109 to trunk 104 on which the calling party's call was received.

The calling party may supply the card number by pressing keys on the keypad of telephone station 101, thereby generating dual tone multi-frequency signals representing the card number. If signals are so generated, dual tone multi-frequency receiver (DTMF REC) 111 receives and translates them. To this end, switch fabric 118 connects the trunk at which the calling party's call is terminated to dual tone multi-frequency receiver (DTMF REC) 111. The resulting translated digits are supplied to main processor 107, via bus 117.

Conditional branch point 303 tests to determine if main processor 107 received the digits of a card number within a predetermined length of time. If the test result in step 303 is NO, control is passed to step 304, in which an attendant, at attendant position 119, converses with the calling party and has him verbally supply the card number if the call is a card call. The attendant then enters the card number supplied by the calling party into attendant position 119 which, thereafter, transmits it to operator services switch 105. Control then passes to step 305. If the test result in step 303 is YES, indicating that main processor 107 received the digits of a card number within a predetermined length of time, control passes to step 305 directly.

Operator services switch 105 determines the appropriate query protocol based on the card number that was received, in step 305. The appropriate query protocol is determined by matching a prefix portion of the digits of the received card number with those listed in issuer ID field 202 (FIG. 2) of card recognition data base 113 for card numbers that have the same length as the received card number. The corresponding query protocol is, thereafter, retrieved from query protocol field 204.

In step 306, a validation query is initiated by operator services switch 105 and a response is awaited. The query is transmitted via message interface 115 to IXC CCS network 123, which routes the query appropriately. Conditional branch point 307 tests to determine, upon receipt of a response to the validation query, if the response received indicates that the card number supplied was valid.

If the test result in step 307 is NO, control passes to step 308, in which the caller is notified of the invalidity of the supplied card number, by way of an announcement from announcement facility (ANN FAC) 109. Alternatively, if the call is handled by an attendant, the attendant will inform the calling party that the card number supplied is invalid. Additionally, regardless of how the announcement is presented, the caller could be transferred, automatically or in response to prompting, to a customer service representative of the card issuer, if his card is denied. Such a transfer would be accomplished by switch fabric 118 working under the control of main processor 107. Alternatively, a telephone number for customer service of the card issuer could be supplied to the caller as part of the invalidity announcement.

If the test result in step 307 is YES, control passes to step 310 in which operator services switch 105 routes the call to the called party through the IXC network via link 121. Next control passes to conditional branch point 312, which tests to determine if the call was answered. If the test result in step 312 is NO, which indicates the call was not completed, control passes to step 314, which tests to determine if the caller has signaled that he desires to make another card call without having to enter the card number again, i.e., the caller is invoking the well known sequence calling feature for card calls. If the test result in step 314 is YES, control passes to step 316, in which operator services switch 105 receives the new telephone number supplied by the caller. Control then passes back to step 310. If the test result in step 314 is NO, the process exits in step 318.

If the test result in step 312 is YES, indicating the call was completed, control passes to step 320, in which operator services switch 105 waits for the call to terminate. Upon termination of the call, control passes to conditional branch point 322, which tests to determine if it was the caller who initiated the termination of the call, e.g., hung up. If the test result in step 322 is YES, the process exits in step 318. If the test result in step 322 is NO, indicating that the called party hung up, control passes to step 324. That the called party hung up would be indicated to operator services switch 105 by a signal supplied from the IXC network. Conditional branch point 324 tests to determine if operator services switch 105 receives a game request signal from the caller at telephone station 101, in accordance with an aspect of the invention. One such exemplary game request signal is the pressing of the star ("*") key on telephone station 101. The pressing of the star key is detected by dual tone multi-frequency receiver (DTMF REC) 111.

If the test result in step 324 is YES, control passes to step 326, in which game processor 157 (FIG. 1) engages in the game with the caller and determines if the caller is a winner, in accordance with the principles of the invention. If the test result in step 326 is YES, control passes to step 328 in which an announcement is made notifying the caller that he is a winner. Additionally, in accordance with an aspect of the invention, the particular prize that the caller has won may also be announced to him. Next, in step 330 the procedure that results in the awarding of the prize is initiated. Control then passes to step 314, and the process continues as described above. If the test result in step 326 is NO, control passes to step 332, in which an announcement is made to the caller that he is not a winner. If the test result in step 324 is NO, or after execution of step 332, control passes to step 314, and the process continues as described above.

The determination by game processor 157, in step 326, that the user is a winner can be made by employing any well known, or even developed in the future, gaming techniques. For example, one technique for determining that the caller is a winner is to select a number at random from the set of integers from zero to one billion and if the selected number turns out to be zero the person is a winner. Another method is to prompt the caller to enter a number on the touch tone pad of telephone station 101 and if that number matches a preselected number then the caller is a winner. A third method is to select a random call length and if the caller's call was within a predetermined tolerance of the call length then the caller is a winner.

The caller's chances of winning may be adjusted based on various factors, e.g., length of previous call, frequency of calling, distance of call, whether the caller subscribes to special savings plan, the total number of calls made by the subscriber in a particular time period, total length of calls made is a predetermined time period. This information can be stored in association with the caller's card number in the corresponding card data base. Those skilled in the an will know how to implement the various games and to adjust them for factors such as the foregoing. The value of the prize to be awarded if the caller is a winner may also be similarly adjusted.

The prizes that may be awarded in step 330, can include free telephone calls, including making the immediately preceding call free, or any other prize. Should the prize be something other than free telephone calls, such as an item that must be sent to the caller, e.g., a television set or a new car, operator services switch 105 transmits a message indicating the type of prize that must be sent to the caller and any necessary information to achieve its sending via message interface 115 and IXC CCS network 123 to printer 150.

In another embodiment of the invention, the caller need not signal that he wishes to engage in the game. Instead, the caller is automatically engaged in the game. If the caller is a winner, he is immediately notified. Alternatively, if the caller hangs up before being notified, a notice can be supplied with the caller's bill or the caller could be informed that he was a winner the next time that he attempts to make a card call.

Although the embodiment shown is for card calls, those skilled in the an will readily be able to apply the principles of the invention to non-card calls. For non-card calls, the subscriber's account number, typically the subscriber's telephone number, will function in the place of the card number and the switch of the telecommunications carrier's network that is responsible for timing and billing the call will perform the functions of operator services switch 105.

Figure 5:
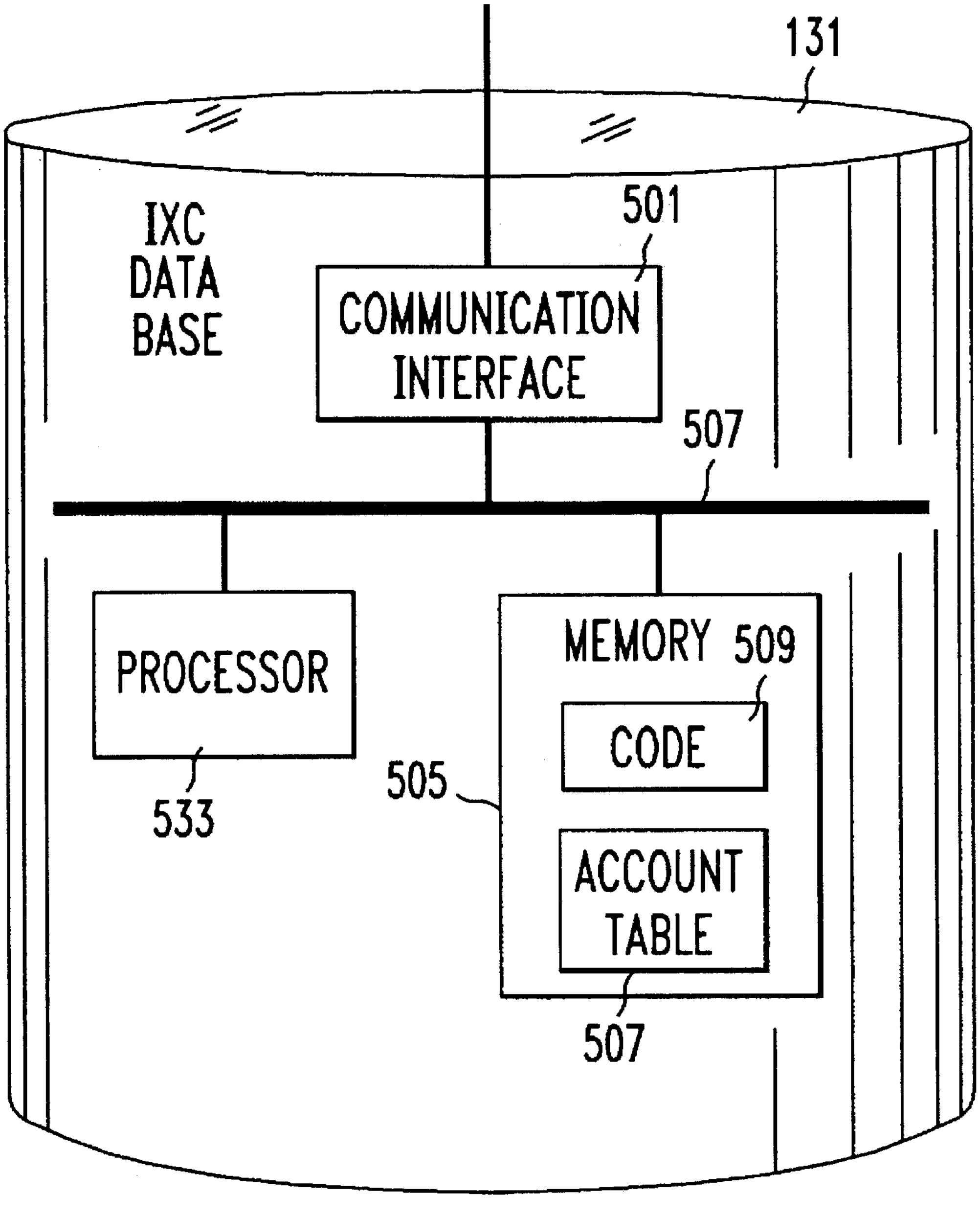
FIG. 5 shows a block diagram view of an exemplary IXC data base shown in FIG. 1.

FIG. 5 shows a block diagram view of IXC data base 131 (FIG. 1). Shown are a) communication interface 501 (FIG. 5), b) processor 503, and c) memory 505 connected via bus 507. Communication interface 501 is a protocol conversion unit that permits IXC data base 131 (FIG. 1) to communicate with a common channel signaling (CCS) network, such as IXC CCS network 123 and ultimately with operator services switch 105. It is responsible for formatting all messages transmitted by IXC data base 131 to IXC CCS network 123 and for extracting responses received from IXC CCS network 123. In particular, responses to the validation queries are transmitted to IXC CCS network 123 while validation queries are received therefrom. Processor 503 (FIG. 5) provides all the computational capability necessary to control all the processes of IXC data base 131. Memory 505 includes 1) code portion 509, which contains the instructions (program) used by processor 503 to control the processes of IXC data base 131 and 2) authentication information for those cards issued by the IXC. Code portion 509 (FIG. 5) includes instructions for performing the processes for performing card validations. Bus 507 provides for the exchange of data between the components of IXC data base 131 (FIG. 1). LEC data bases 127 and card issuer data bases 137 may be structured similar to IXC data base 131.

In other embodiments of the invention, announcement facility (ANN FAC) 109 (FIG. 1) can supply announcements that can eventually be perceived by the calling party but are in forms other than voice. For example, announcement facility (ANN FAC) 109 might supply messages that can be displayed on a display incorporated into telephone station 101. In another embodiment, dual tone multi-frequency receiver (DTMF REC) 111 might be replaced with a message receiver that can receive signals other than dual tone multi-frequency signals. These signals would be supplied from telephone station 101 to deliver the card number to operator services switch 105. For example, a magnetic card stripe reader could be incorporated into telephone station 101 and supply ISDN-formatted messages containing the card number to operator services switch 105. Alternatively, voice recognition unit 116, which recognizes the digits of the card as spoken by the caller, might be invoked for use in a particular call instead of dual tone multi-frequency receiver (DTMF REC) 111. Those skilled in the art will also recognize that, for such embodiments, strings other than strings of digits may be used to identify an account associated with a card.

To meet legal requirements, it may be necessary to provide an alternate method for people to engage in the game without having to make a call that they must pay for. Such an alternate method is beyond the scope of this application.

The foregoing illustrates the principles of the invention. It will thus be appreciated that those skilled in the art will be able to devise various arrangements which, although not explicitly described or shown herein, embody the principles of the invention and are thus within its spirit and scope.

I claim:

1. A method for use in processing a call for a caller by a telephone service provider, said call being processed in a telephone network having a plurality of destinations to which said call may be connected, the method comprising the steps of:

said telephone service provider completing said call for said caller through said telephone network to a third party destination of said telephone network;

in response to termination of a portion of said call by said third party in said telephone network, entering said caller in a game of chance having predetermined rules for winning, said destination to which said caller's call was completed being other than a processor for engaging said caller in said game of chance;

determining, using said rules, whether said caller is a winner in said game; and supplying information to said caller to inform him that he is a winner if it is determined in said determining step that said caller is a winner.

2. The invention as defined in claim 1 further including the step of receiving in said telephone network a signal from said caller indicating that he wishes determine if he is a winner and wherein said entering, determining and supplying steps are responsive to said signal.

3. The invention as defined in claim 1 wherein said call is a card call.

4. The invention as defined in claim 1 wherein the chances of winning said game are based on the length of said call.

5. The invention as defined, in claim 1 wherein the value of a prize to be awarded if said caller is a winner is based on the length of said call.

6. A telephone network provided by a telephone service provider for processing a telephone call from a caller, comprising:

means for playing at least one game having predetermined rules and for the winning of which said caller will receive a prize;

means for completing said telephone call by said telephone service provider from said caller to a third party telephone number independent of said game playing means; and means for engaging said caller in said at least one game as a result of completion of the portion of said telephone call to said third party.

7. The invention as defined in claim 6 further wherein said means for engaging is responsive to the termination of said completed telephone call by said third party.

8. The invention as defined in claim 6 wherein said call is a card call.

9. The invention as defined in claim 6 wherein said call is a non-card call.

10. The invention as defined in claim 6 further including means responsive to said game playing means for indicating to said caller that he has won said at least one game.

11. The invention as defined in claim 6 wherein the probability of winning said at least one game is adjustable by said game playing means based on the values of a set of parameters.

12. The invention as defined in claim 6 wherein the value of the prize to be awarded for the winning of said at least one game is adjustable by said game playing means based on the values of a set of parameters.

13. The invention as defined in claim 6 further including means for printing the name of the prize won by said caller.

14. Apparatus for playing a game in using a telephone system provided by a telephone service provider, comprising:

a telephone network for completing a caller's call by said telephone service provider to a third party;

means for playing a game in accordance with predetermined rules;

means, responsive to completion of the portion of said caller's call to said third party using said network to a telephone number independent of said game playing means, for activating said game playing means to enter said caller in said game; and means for transmitting the result of the game to said caller.

15. The invention as defined in 14 wherein said call is a card call.

16. A method for use in playing a game in a telephone network provided by a telephone service provider, comprising the steps of:

processing a call by said telephone service provider for a caller to a third party; and upon the conclusion of processing for said call to said third party, connecting said caller to a game processor for playing a game;

wherein said call was not dialed by said caller to a telephone number assigned to reach said game processor.

17. The invention as defined in claim 16 wherein said processing is concluded because said call terminated by said third party.

18. The invention as defined in claim 17 wherein said call was successfully completed prior to its termination.

19. A method for use in a telephone network processing a call by a telephone service provider for a caller to a third party, comprising the step of:

said telephone service provider automatically connecting said caller to a game processor upon completion of the portion of said call to said third party, said call not having been specially dialed by said caller to reach said game processor.

20. The invention as defined in claim 19 further including the step of activating said game processor on said call in response to a signal from said caller to engage said caller in a game.

21. The invention as defined in claim 19 further including the step of automatically activating said game processor on said call upon its connection to said call to engage said caller in a game.

22. The invention as defined in claim 19 further including the steps of:

automatically activating said game processor upon its connection to said call to engage said caller in a game; and deactivating said game processor on said call in response to a signal from said caller so as to prevent said caller from engaging in said game.

23. The invention as defined in claim 19 further including the steps of:

engaging said caller in a game played on said game processor; and indicating to said caller whether he is a winner.

24. A method for use in processing a call by a telephone service provider for a caller in a telephone network to multiple third parties having a plurality of destinations to which said call may be connected, said call being the last of a predetermined number of calls processed for said caller in said telephone network within a predetermined time period, the method comprising the steps of:

completing said call to said third parties for said caller through said telephone network to a destination of said telephone network by said telephone service provider;

in response to termination of said calls to said third parties in said telephone network, entering said caller in a game of chance having predetermined rules for winning, said destination to which said caller's call was completed being other than a machine for engaging said caller in said game of chance;

determining, using said rules, whether said caller is a winner in said game; and supplying information to said caller to inform him that he is a winner if it is determined in said determining step that said caller is a winner.

25. A method for use in playing a game in a telephone network provided by a telephone service provider, comprising the steps of:

processing a plurality of calls to third parties for a caller, said plurality of calls including a predetermined number of calls; and upon the conclusion of processing for the last call of said plurality of calls to said third parties, said telephone service provider automatically entering said caller in a game of chance having predetermined rules for winning;

wherein said plurality of calls were not dialed by said caller to any telephone number assigned to reach a game processor implementing said game.

26. A method for use in playing a game in a telephone network, provided by a telephone service provider comprising the steps of:

processing a plurality of calls originated from a particular telephone line to a plurality of third parties said plurality of calls including a predetermined number of calls; and upon the conclusion of processing for the last call of said plurality of calls, said telephone service provider automatically connecting said telephone line to a game processor;

wherein said calls were not dialed to any telephone number assigned to reach said game processor.

* * * * *